United States Patent [19]

Ebert et al.

[11] Patent Number: 4,464,428
[45] Date of Patent: Aug. 7, 1984

[54] CLOSED CELL FOAMED MATERIAL HAVING INTERIOR CANALS FILLED WITH SUBSTANCES

[75] Inventors: Heinrich Ebert, Abtsteinach; Manfred Noe, Laudenbach; Kurt Wind, Weinheim; Wilhelm Kirsch, Birkenau, all of Fed. Rep. of Germany

[73] Assignee: Firma Carl Freudenberg, Weinheim, Fed. Rep. of Germany

[21] Appl. No.: 401,341

[22] Filed: Jul. 23, 1982

[30] Foreign Application Priority Data

Dec. 9, 1981 [DE] Fed. Rep. of Germany ....... 3148710
Dec. 9, 1981 [DE] Fed. Rep. of Germany ....... 3148711

[51] Int. Cl.³ ............................................. B32B 3/10
[52] U.S. Cl. ..................................... 428/95; 428/137; 428/314.4; 428/317.9
[58] Field of Search ...................... 428/86, 87, 91, 95, 428/131, 134, 135, 137, 206, 234, 235, 300, 314.4, 314.8, 317.9

[56] References Cited

U.S. PATENT DOCUMENTS

| | | | |
|---|---|---|---|
| 3,352,739 | 11/1967 | Blue | 428/235 |
| 3,357,516 | 12/1967 | Cadotte et al. | 428/131 |
| 3,649,430 | 3/1972 | Lewis et al. | 428/247 |
| 3,867,240 | 2/1975 | Doerfling | 428/172 |
| 4,009,315 | 2/1977 | Healy et al. | 428/300 |
| 4,020,207 | 4/1977 | Alfter et al. | 428/319.1 |
| 4,125,664 | 11/1978 | Giesemann | 428/131 |
| 4,131,703 | 12/1978 | Voet | 428/234 |
| 4,183,984 | 1/1980 | Browers et al. | 428/131 |
| 4,199,639 | 4/1980 | Ronc | 428/300 |

FOREIGN PATENT DOCUMENTS

| | | | |
|---|---|---|---|
| 111253 | 8/1980 | Japan | 428/206 |
| 1271101 | 4/1972 | United Kingdom | 428/300 |

*Primary Examiner*—William J. Van Balen
*Attorney, Agent, or Firm*—Kenyon & Kenyon

[57] ABSTRACT

A web of a cross-linked plastic material foamed in a closed-cell structure or configuration, having substantially parallel upper and lower surfaces, wherein canals penetrate the foamed material and extend and open to at least one of said upper and lower surfaces, and wherein substances can be introduced into the canals to impart beneficial properties to the web of foamed material.

17 Claims, 9 Drawing Figures

CLOSED CELL FOAMED MATERIAL HAVING INTERIOR CANALS FILLED WITH SUBSTANCES

BACKGROUND OF THE INVENTION

The present invention relates to a web of closed cell foamed material made from soft plastic, the foamed material having essentially parallel upper and lower surfaces.

Webs of foamed material of the above-mentioned type have long been known in the art. When such webs are prepared from cross-linked polyolefins, they are completely inert, can still be formed after a prior heating, have excellent spring-back elasticity and exhibit a substantial heat insulating capacity. As a result of these properties, webs of closed cell foamed material made from cross-linked polyolefins have found diverse applications in the automotive field, in the field of insulation, in the manufacture of toys, camping equipment, sport articles, packing material, seat coverings, apparel and orthopedic products, advertising and display articles and in the building construction industry. However, these webs of foamed material exhibit the disadvantage of possessing low permeability to heat, moisture and sound and it is difficult, if not impossible, to achieve any degree of control or improvement in these properties. For example, while it may be possible to alter these properties by embedment of suitable materials in the foamed web, the closed cell or closed pore structure of the web prohibits such embedment. Even where it is possible to arrange that the web of foamed material originally contain alterations designed to improve these properties, the application of heat and pressure in forming the finished web results in a densification of the pore structure which frequently disadvantageously affects the originally set properties.

SUMMARY OF THE INVENTION

It is an object of the present invention to provide a web of foamed material which can be adjusted to possess clearly defined, predetermined properties with respect, for example, to sound and moisture absorption or permeability.

According to the present invention, this and other objects are achieved through the provision that the web of foamed material, from its top and/or bottom surface, is interrupted by canals which penetrate into the web of foamed material and into which canals foreign substances can be embedded.

When the foreign substances embedded in the canals are solid particles, these particles are connected to each other only by way of the soft, elastic closed-cell foam. As such, the particles do not inhibit the deformation of the web of foamed material under application of heat and pressure, but bring about excellent stabilization of the pore structure of the foamed material. In this manner, changes in pre-set properties of the foamed material are prevented during deformation.

The canals which interrupt the top and/or underside of the web of foamed material can penetrate into the foamed material perpendicularly or at an angle to the lengthwise direction in the manner of blind holes. The canals can penetrate the web completely so that one opening of the canal interrupts the top side and the other opening of the canal penetrates the underside. The canals also can merge with each other in such a way that each canal has several openings in the vicinity of the top and/or underside. In this case, the individual subcanals enclose an acute angle with the lengthwise direction of the web of foamed material. Effects in which a special design of the surface is of decisive importance, such as the absorptivity or permeability to airborne sound or moisture, can be substantially enhanced in this manner.

The canals consist perferably of circular or polygonal holes which are generated in the web of foamed material without removal of material. The material of the web of foam material is densified in the immediate vicinity of the canals, which favors securing of any foreign substances that may be contained in the canals. The inside wall of the canals consists substantially of the walls of the cut spherical pores of the foam material and the inside wall therefore exhibits heavy crevice formation which is of great advantage for absorptivity. The absorptivity can be increased further through the embedment in the canals of cellulose or other particles, as well as fibers having an open pore structure.

The inward-projecting parts of these cell walls have great adaptability and can penetrate into the finest surface irregularities of particles that may be embedded. The particles are therefore additionally secured with respect to being anchored.

The diameter of the particles to be embedded can be chosen freely within a relatively wide range. A mechanically strong hold is obtained even if the largest diameter of the particles is only slightly larger than the smallest diameter of the canals. However, even better seating is obtained if the profile of the particles corresponds approximately to that of the canals or is chosen somewhat larger.

Independently of anchoring achieved by means of choice of particular particle sizes, it also is possible to join the particles adhesively to the wall of the canals, for example, by thermoplastically softening the polyolefin foam per se or with the aid of a reactive adhesive. In both cases, particularly good homogeneity of the mechanical properties is achieved.

The solid particles can include those of natural materials, for example, wood or leather. Both materials have good water absorptivity and, hence, webs of foam material containing such materials are particularly suitable for the manufacture of high-quality insert soles. The same purpose can be served by embedment of solid particles of odor-absorbing activated carbon. The embedment into the canals of cellulose or other particles having an open pore structure improves the moisture absorptivity of the foamed material. The embedment into the canals of sand, chalk or metal can be used to substantially increase the weight of the web of foamed material, which is of considerable importance in the manufacture of sound insulating materials.

The solid particles may also consist of synthetic materials, for example, plastic, soap or corundum. Use of the latter material makes the web of foamed material suitable for use as a grinding stone. The web of foamed material, because of its closed pore structure, does not absorb abraded material and always possesses constant flexibility and elasticity.

The solid particles may be composed of various individual components of different types, and in such instances will typically have a relief-structured surface to aid in fixation of the particles in the canals. Utilization of solid particles having a smooth surface, particularly in the vicinity where the canals open to the upper and/or lower surface of web of foamed material, can contribute to improved sliding behavior of the web where this is desired. Column-shaped particles are useful for stabilizing the canals, and the web material, along the lengthwise dimension. Perpendicular embedment is advisable in those cases where the web of foamed material is subjected to high stress from tension or compressive forces.

The solid particles may consist of fibers or filaments, the latter being understood to be a larger group of individual fibers which are interwoven, twisted or cemented together. The individual fibers may also contain a multiplicity of filaments loosely joined together. The fibers and/or filaments can have ends which protrude from the openings of the canals to the upper and/or lower surfaces of the web of foamed material. The fiber or filament ends closely interact with the environment and thus can preferentially absorb or conduct away airborne sound and moisture, particularly if the individual filaments or fibers have a spacing from each other as uniform as possible and form more or less a closed nap. If filaments are employed, the ends should be loosened, to the degree practicable, in tuft-fashion.

The ends of the fibers or filaments can be joined together and/or to the web of foamed material, for example, by mutual cementing. The ends may be bound into a nonwoven fabric, a nonwoven fabric cloth, a woven fabric, a knit fabric or a foil to form a unit together with the planar structure.

An enlarged pore structure, and hence a better suction or sound absorption capability, can be obtained in the web of foamed material if fibers and/or filaments are employed which are wrinkled either singly or multiply.

In cases where the objective is primarily to improve the mechanical properties of the web of foamed material during deformation, it is advantageous to reclose the canal openings after solid particles have been introduced therein, so as to prevent subsequent embedment of undesired particles which might otherwise impair the mechanical properties of the web. Thin foils applied to the upper and/or lower surface of the web of foamed material may be employed for this purpose. The foils can be chosen so as to be moisture impermeable and generally consist of a flexible soft material having a thickness of not more than 30 um.

The web of foam material according to the present invention can consist of a cross-linked polyethylene foamed with closed cells, a cross-linked polypropylene foamed with closed cells, or a mixture of both materials. Apart from its improved temperature resistance, polypropylene is distinguished by having a greater hardness than polyethylene. Polyethylene, however, has a higher absorptivity for airborne sound. The intended application of the web of foamed material, therefore, dictates the choice of polyolefin in this case. Webs of foam material of polymer materials produced by polycondensation, polymerization or polyaddition also can be used (for example, PVC, EVA, polystyrene, and the like). Through the use of these foam materials, certain mechanical, electrical and optical properties can be obtained in a targeted predetermined manner (for example, tensile strength, modulus of elasticity, dimensional stability, behavior upon heating, insulation behavior, and the like).

Webs of foam material having only partially closed cells, such as 70% closed and 30% open cells, also can be given controlled properties according to the present invention.

The web of foam material according to the present invention also can be modified substantially as to its properties after its preparation by embedding therein certain amounts of solid particles of a particular kind, a particular size and a particular mutual relationship. This subsequent modification is possible without a particularly large technical effort and leads to defined properties which are always reproducible.

DETAILED DESCRIPTION OF THE INVENTION

The present invention is described in further detail with reference to the following illustrative embodiments, keyed to the figures earlier described.

Figure 1:
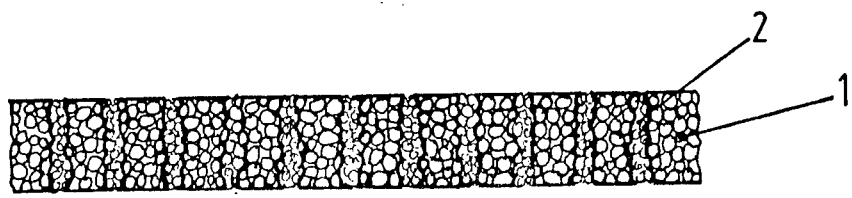
FIG. 1 shows a web of foam material of a cross-linked plastic body foamed with closed cells, which is penetrated completely by canals distributed in pattern-fashion.
Figure 1A:
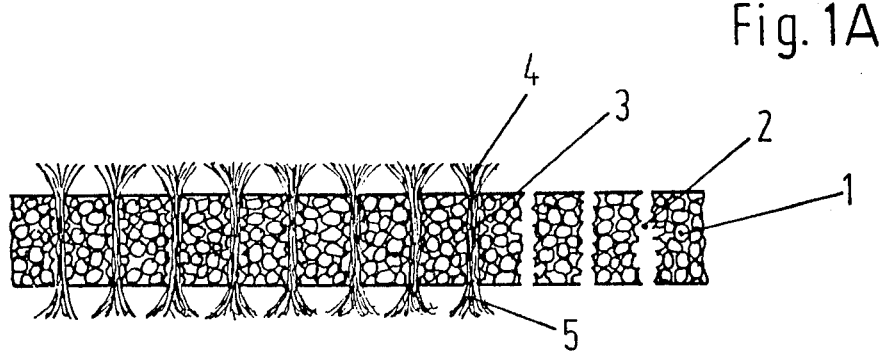
FIG. 1A shows a web of foamed material of cross-linked polyolefin plastic formed with closed cells, which is completely penetrated with canals in which filaments, with ends protruding from the upper and lower web surfaces, are contained.

The web of foam material according to FIG. 1 and FIG. 1A consists of cross-linked polyethylene foamed with closed cells, having a bulk weight of 70 kg/m³. The thickness of the web is 10 mm.

The web of foam material is completely penetrated by the perpendicular canals 2 which are uniformly distributed over the entire surface in pattern-fashion. These canals have a circular profile which can be seen in the region of the top side and the region of the underside, and have a mutual center distance of 2 mm.

Due to the multiplicity of the originally spherical cells which have been sliced in the process of providing the canals, the profile of each canal shows heavy crevice formation. The effective absorption surface of the canal is greatly enlarged in this manner.

Into the canals (FIG. 1A) are clamped filaments with an elastic pretension of the web of foamed material, which filaments have a diameter of 0.7 mm. Filament ends 4 and 5 protrude from the canal openings and, in the protruding part, are loosened in a tuft-like manner to give a nap-like appearance to the upper and lower surfaces. The filaments are made of cotton and, hence, have a high absorptivity.

Figure 2:
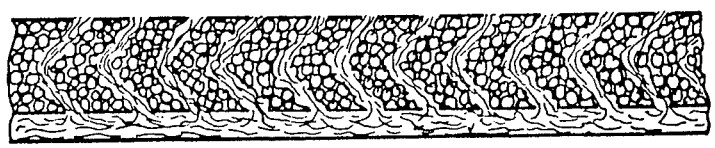
FIG. 2 shows a web of foam material according to FIG. 1, in which the canals interrupting the top side and those interrupting the underside are interrelated and penetrate into the interior of the web of foam material at an acute angle, where they merge with each other. In the canals are contained fiber bundles which are bound into planar textile structure arranged on the underside.

The canals penetrating the web of foam material according to FIG. 2 are bent approximately in the center of the web of foam material at a right angle and contain bundles of polypropylene fibers which are bound into a nonwoven fabric placed on the underside of the web. The absorptivity of the web is, as a result, greatly increased. The nonwoven fabric likewise consists of polypropylene fibers and has an area weight of 150 g/m$^2$ with a thickness of 3 mm. It is distinguished by good springback elasticity and complete freedom from bonding agents.

The moisture absorptivity of polypropylene is negligibly small. Even so, a web of foam material according to FIG. 2 has good permeability for water vapor due to the capillary action effective between the individual polypropylene fibers. The pore system of the nonwoven fabric layer arranged on the underside is directly connected to that of the fibers contained in the canals. As a consequence, the underside has a larger capacity than the top side with respect to absorptivity as well as a larger rate of giving off water vapor per unit time. Absorbed moisture is preferably stored in this area. An insert sole designed accordingly, for example, thereby has a surface with dry appearance even after extended use, and the absorbed moisture can evaporate in a short time via the exposed underside after the insert sole is taken from the shoe.

Figure 3:
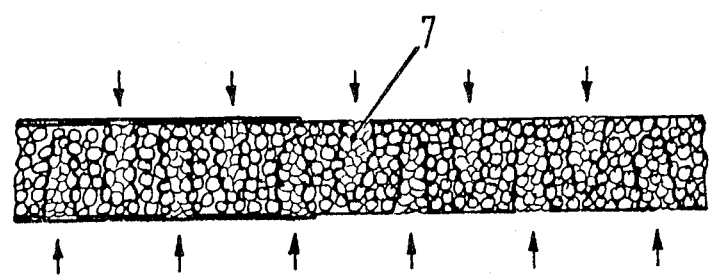
FIG. 3 shows a web of foam material of a cross-linked plastic body foamed with closed cells, wherein the top side and underside are each interrupted by canals which are distributed in pattern-fashion, penetrate perpendicularly into the web of foam material and have the shape of blind holes. The canals are not in communication with each other and they are filled with a powder of mineral material.

The embodiment according to FIG. 3 shows a web of foam material of a cross-linked polyethylene foamed with closed cells with a thickness of 15 mm. The top and underside of the web of foam material are interrupted by canals which penetrate alternatingly and perpendicularly, and are shaped in the manner of blind holes. The closed end of these canals always has a distance of 1.5 mm from the opposite side. The canals have a circular profile which can be seen at the opening, with a diameter of 3 mm. The mutual spacing of the axes is 12 mm.

The canals are filled with porous barium sulfate, whereby the web of foam material has a large weight of 650 g/m$^2$ and a high degree of absorption for airborne sound. The web of foam material is, therefore, highly suitable for sound insulation. In the left-hand part of the drawing, the web of foam material is joined to an airpermeable foil of polyethylene which has a thickness of 35 um. This prevents the filler material from trickling out.

Figure 4:
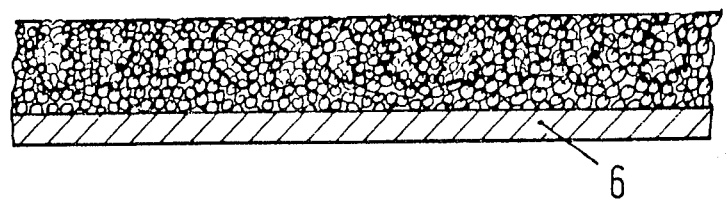
FIG. 4 shows an embodiment similar to FIG. 3, where only the top side of the web of foamed material is interrupted by canals which penetrate perpendicularly, are distributed over the surface in pattern-fashion and are shaped as blind holes. A reinforcement layer is laminated onto the underside.

FIG. 4 shows a web of foam material similar to FIG. 3 with the difference that the foam material is a crosslinked polypropylene foamed with closed cells and a bulk weight of 150 kg/m$^3$. The thickness is 10 mm, and the openings of the canals are exclusively arranged side by side on the top side. The underside of the web of foam material is laminated on a metallic support sheet 6 which facilitates the installation in an application as a sound absorbing mat.

Figure 4A:
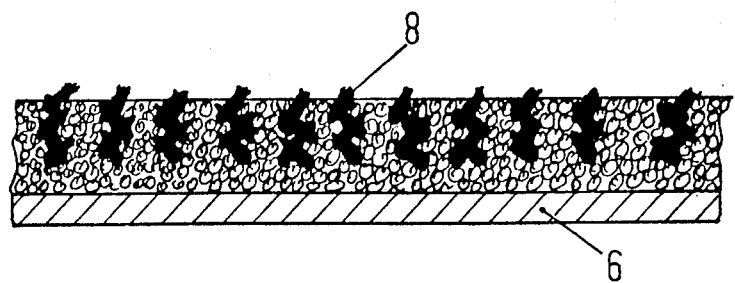
FIG. 4A is identical to FIG. 4 with the exception that the canals are filled with irregularly formed bodies of an abrasive material.

In the canals (FIG. 4A) are arranged bodies of corundum which fit exactly into the inside profile of the canal and which protrude at the canal openings in relief-fashion. The support sheet 6 in this embodiment is metal which permits easy handling when the web of foamed material is used as a grinding stone.

Figure 5:
FIG. 5 shows an embodiment similar to FIG. 4 where, however, two of the canals interrupting the top side of the web of foam material in pattern-fashion always merge with each other in the interior of the web of foamed material.
Figure 5A:
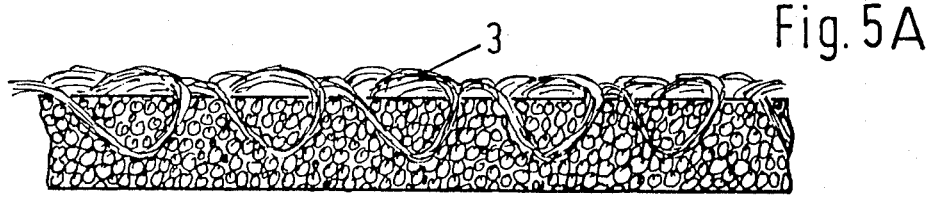
FIG. 5A is identical to FIG. 5 with the exception that the canals contain filaments with ends protruding from the canal openings. The ends are bent over to the left and are cemented to the upper surface of the web of foamed material.

The embodiment according to FIG. 5 consists of a web of cross-linked polyethylene foamed with closed cells with a bulk weight of 90 kg/m$^3$. The thickness is 8 mm, and the top side shows the openings of canals that merge with each other in the interior of the web of foam material. In the canals (FIG. 5A), bundles of wrinkled polyester fibers having a diameter of 3 mm are arranged, the ends of which protrude above the openings, are bent over to the left side and are cemented to the upper surface of the foamed body.

The material is rot-proof, has a textile-like soft surface and high water absorptivity. For this reason, it is highly suitable for the manufacture of high quality insert soles.

Figure 6:
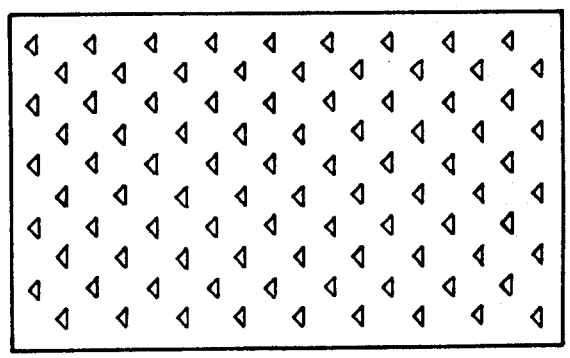
FIG. 6 shows the top side of a web of foam material for illustrating a possible mutual relationship of the position of the individual canals.

FIG. 6 shows the top side of the web of foam material which is interrupted by a multiplicity of canal openings which are interrelated in pattern-fashion. The profile is of triangular shape but is seen clearly only in the vicinity of the opening proper of the canal because there the web of foam material is uniformly terminated in foilfashion. In the interior, the profile exhibits crevices such as can be seen in FIG. 1.

What is claimed is:

1. In an improved web consisting of a crosslinked plastic material foamed in a closed-cell configuration, said web having substantially parallel upper and lower surfaces, the improvement comprising providing said web with a multiplicity of interior canals which extend and open to at least one of said upper and lower surfaces of said web so as to form distributed patterned interruptions on said surfaces, said canals being filled with subsequently introduced substances selected from the group consisting of solid particulate bodies, bundles of fibers and bundles of filaments.

2. The web of foamed material according to claim 1 wherein said canals extend and open to both of said upper and lower surfaces and merge within the body of said foamed material.

3. The web of foamed material according to claim 1 wherein said canals extend perpendicularly through said foamed material and extend and open to both of said upper and lower surfaces.

4. The web of foamed material according to claim 1 wherein said canals extend at angles within said foamed material and extend and open to both of said upper and lower surfaces.

5. The web of foamed material according to claim 1 wherein the openings of said canals to at least one of said upper and lower surfaces defines on said surface a circular or polygonal opening.

6. The web of foamed material according to claim 1 wherein said canals contain introduced substances to impart increased sound and/or moisture absorption properties to said foamed material.

7. The web of foamed material, according to claim 1 wherein said solid particulate bodies are selected from the group consisting of wood, leather, activated carbon, sand, chalk, metal, cotton and sheep's wool.

8. The web of foamed material according to claim 1 wherein said solid particles are selected from the group consisting of plastic, soap, corundum and cellulose.

9. The web of foamed material according to claim 1 wherein said solid particulate bodies are substantially spherical.

10. The web of foamed material according to claim 1 wherein said solid particulate bodies are shaped in the form of columns.

11. The web of foamed material according to claim 1 wherein said solid particulate bodies have a surface selected from the group consisting of a smooth surface and a surface structured in relief fashion.

12. The web of foamed material according to claim 1 wherein at least some of the ends of said fibers and/or filaments protrude beyond the openings of said canals to said upper and/or lower surfaces.

13. The web of foamed material according to claim 12 wherein said protruding ends are connected to each other and/or to the web of foamed material.

14. The web of foamed material according to claim 12 wherein said protruding ends are bound into a member selected from the group consisting of a nonwoven fabric, a woven fabric and a foil.

15. The web of foamed material according to claim 1 wherein said fibers and/or filaments are wrinkled at least in part.

16. The web of foamed material according to claim 1 wherein said introduced substances are at least partially cemented to the walls of said canals.

17. The web of foamed material according to claim 1 wherein at least one of said upper and lower surfaces is covered by an air-impermeable foil layer.

* * * * *